March 11, 1924.
T. VICARS ET AL
VARIABLE SPEED GEAR
Filed July 7, 1921
1,486,704
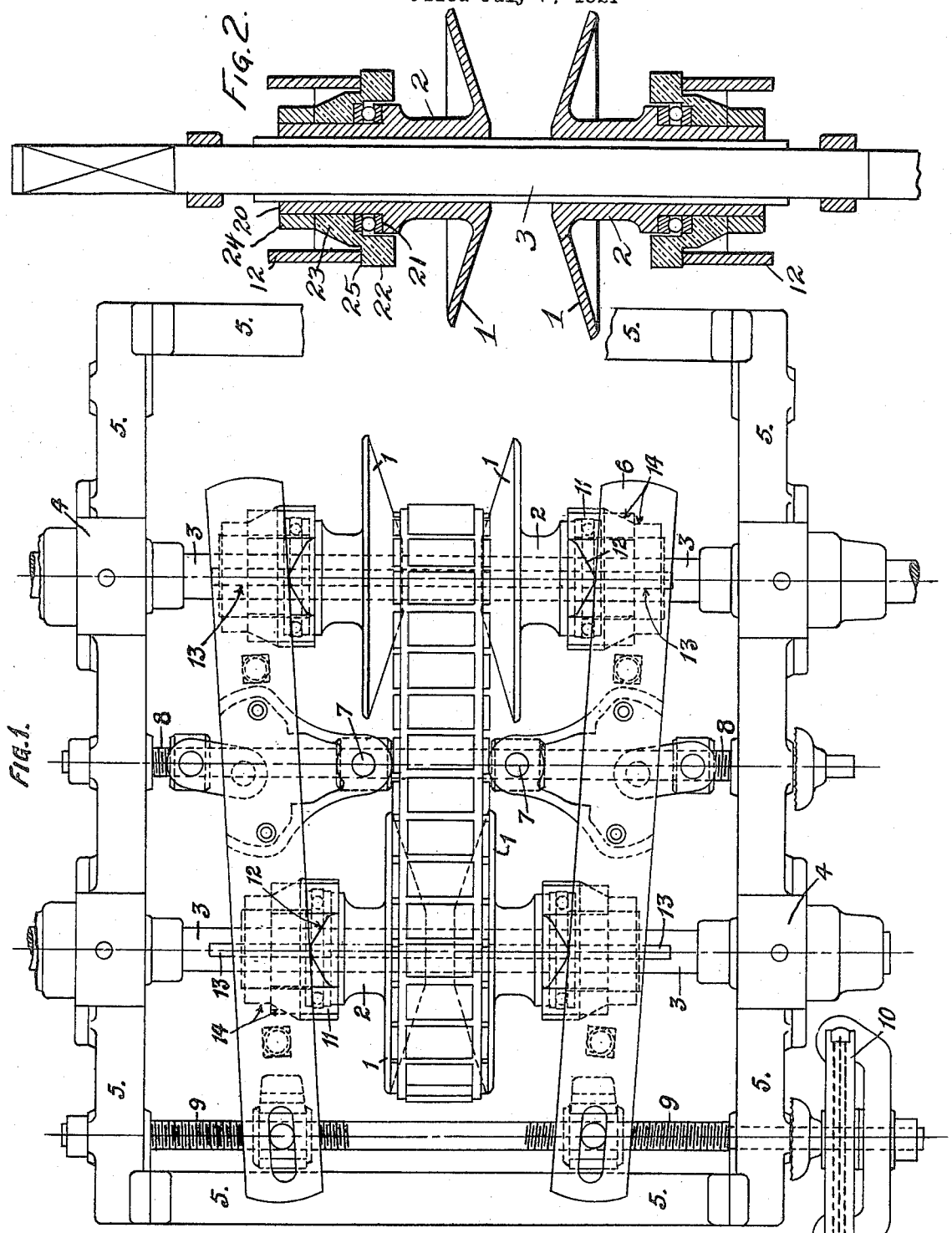
INVENTORS
T. & E.L. Vicars.

Patented Mar. 11, 1924.

1,486,704

UNITED STATES PATENT OFFICE.

THOMAS VICARS AND EDWARD LYNTON VICARS, OF EARLESTOWN, ENGLAND.

VARIABLE-SPEED GEAR.

Application filed July 7, 1921. Serial No. 482,924.

*To all whom it may concern:*

Be it known that we, THOMAS VICARS and EDWARD LYNTON VICARS, subjects of the King of England, and residing at Earlestown, in the county of Lancaster, England, have invented Improvements in Variable-Speed Gears, of which the following is a specification.

This invention has reference to variable speed gears of the kind in which a belt consisting of a multiplicity of transverse bars or "teeth" on an endless band work in connection with two V pulleys each consisting of two relatively adjustable coned discs, mounted and movable on shafts, to which they are operatively connected by means of splines extending completely through the bosses and parts of the discs, the halves of which discs are moved simultaneously towards and away from one another, respectively, by means of screw gear acting through double pivoted levers, one in connection with each side of a pulley; so that, as this screw gear is operated, the two discs of each pulley operated upon, are moved towards one another, and away from one another, respectively. The shafts, screw gear and parts are all carried in a suitable frame.

In this speed change gear, the splines or keys of the disc shafts, which are carried completely through the bosses and parts of the discs, are made long enough to give a full bearing of the parts in any position—up to the extreme outward position—of the coned discs and parts; and the bosses are made sufficiently strong to allow the keyways to be cut completely through, and a relatively large ball thrust bearing used. The housing of the thrust bearings of the disc shafts is kept in position by a plain collar which may be advantageously secured by two screws, half in the boss and half in the collar.

By this means the necessity of the splines being kept short enough to clear the thrust housing, as in some cases at present, when the discs are at the closest position, is avoided, in which cases a very short bearing on the splines exists, when the discs are at the widest position apart; and even in the case where the thrust bearings are on the bosses of the discs, and the splines or keyways are not cut through the boss, only a short bearing of the splines is furnished in the outermost positions of the discs, and this is avoided by this invention.

On the back of the coned discs, which slide on the supporting shafts, are V-shaped projections or bosses, connected with thrust bearings which the inner edges of the double operating levers act on, the thrust bearing and its housing being between the levers and the discs and lying within the double levers.

The invention is illustrated in the annexed drawings, in which Fig. 1 is a plan of the improved variable speed gear, and Fig. 2 is a sectional view showing one of the cone shafts and thrust bearing.

Referring to the drawings, 1 are the cone discs, 2 the bosses or hubs of same, 3 are their supporting shafts, 4 are the bearings of the shafts, and 5 the frame in which the bearings are mounted. 6 are the double operating levers, pivoted at 7 to the transverse shafts 8 in the known way. 9 is the operating threaded shaft having on its outer end the operating chain wheel 10. 11 are the ball or roller thrust bearings on the bosses of the discs 1, by which the thrust of the discs 1 is taken upon the V-shaped portions 12 of the housings of which, the edges of the levers 6 bear and act; the housings being disposed within the double levers. The hubs 2 are formed to provide inner reduced portions 20 terminating at the forward ends in shoulders 21. Mounted on these reduced portions and abutting against the shoulders are ball thrust bearings 22. A bearing ring 23 encloses each thrust bearing, bears upon the reduced portion 20, and against the outside member of each thrust bearing. Each bearing ring 23 is held in position by a collar 24 secured upon the reduced portion 20, the bearing rings being further formed with shoulders 25 for the operative engagement of the portions 12 of the housings.

The keys or splines in the shafts 3 are marked 13, see more particularly Figure 3, and are of such a length that when the discs 1 are moved apart for their maximum position, the keys will still be within the whole length of the keyways of the bosses 2 of the discs, so that the discs always have a full bearing on the splines or keys in any position to which they may be moved.

By this means, the discs are easily moved on the shafts 2, even if they are kept running in one position for a long length of time; as by this arrangement the splines or keys and keyways of the bosses do not become indented, which if they did, and do in some constructions heretofore used, make it difficult to move the discs, which is the object and effect of this invention to obviate.

In this gear, the housings of the thrust bearings 11 are kept in position by a plain collar 14 secured with two screws (not shown) half in the boss and half in the collar.

What is claimed is:—

In a variable speed gear, the combination of a frame, two parallel shafts mounted therein, a spline on each shaft extending substantially the full length of the same, a pair of cone-shaped driving elements held on said shaft by the spline and adapted to slide toward and away from each other, a reduced portion on the outer end of the bearing of each driving element to provide a shoulder, a ball thrust bearing mounted thereon, V-shaped elements associated with said ball thrust bearing, levers pivoted between the parallel shafts and having their relatively inner edge portions engaging the said V-shaped elements, said levers being otherwise free of connection with the driving elements, and means cooperating with the levers for operating the same to cause said levers to exert endwise pressure on the V-shaped elements of one pair of driving elements while freeing pressure on the V-shaped elements of the other pair of driving elements.

In testimony whereof we have signed our names to this specification in the presence of two subscribing witnesses.

THOMAS VICARS.
EDWARD LYNTON VICARS.

Witnesses:
 GWEN EDWARDS,
 EUNICE A. EDWARDS.